J. D. SHOCKLEY.
HEN'S NEST.
APPLICATION FILED MAR. 13, 1918.
1,315,046.
Patented Sept. 2, 1919.
2 SHEETS—SHEET 1.
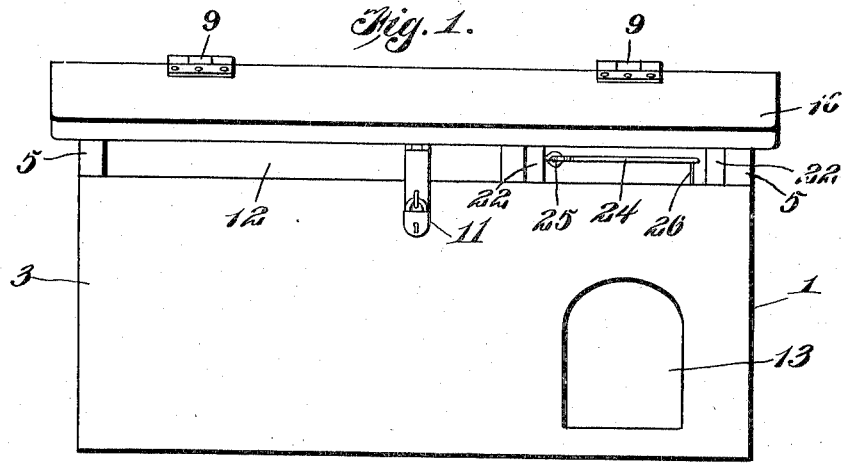
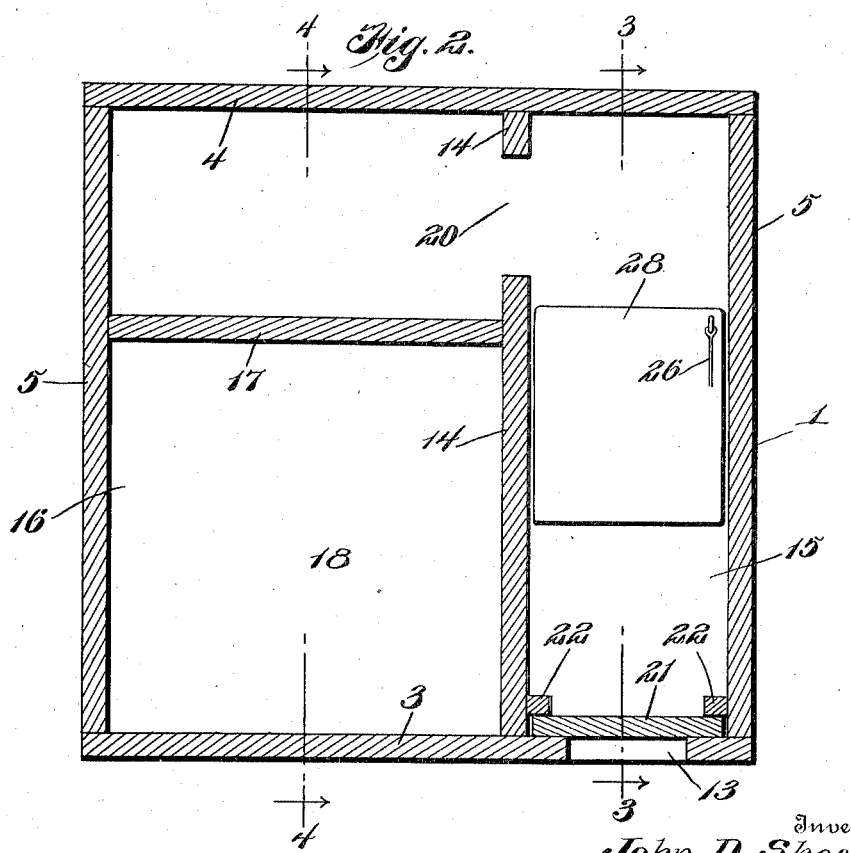
Witness
J. R. Heinrichs
Inventor
John D. Shockley
By C. C. Hines,
Attorney

J. D. SHOCKLEY.
HEN'S NEST.
APPLICATION FILED MAR. 13, 1918.

1,315,046.

Patented Sept. 2, 1919.
2 SHEETS—SHEET 2.

Witness
L. R. Heinrichs

Inventor
John D. Shockley
By C. C. Hines,
Attorney

UNITED STATES PATENT OFFICE.

JOHN D. SHOCKLEY, OF NEWBERRY, SOUTH CAROLINA.

HEN'S NEST.

1,315,046.  Specification of Letters Patent.  Patented Sept. 2, 1919.

Application filed March 13, 1918. Serial No. 222,125.

*To all whom it may concern:*

Be it known that I, JOHN D. SHOCKLEY, a citizen of the United States, residing at Newberry, in the county of Newberry and State of South Carolina, have invented new and useful Improvements in Hens' Nests, of which the following is a specification.

This invention relates to improvements in hens' nests, and particularly to trap nests of that type wherein a trap door is automatically closed behind the hen when she enters the nest, whereby the hen will be held confined for any period desired for the purpose of enabling a record of the number of eggs laid by a particular hen to be made, as well as to enable a poultryman to keep a hen confined during a setting period.

The object of the invention is to provide a trap nest which is simple, reliable, efficient, and inexpensive in construction and operation, which obviates the use of complex working parts, which permits free ventilation and easy cleaning of the nest, and which also allows food and water to be conveniently supplied, while protecting the hen and contents of the nest from dogs or other animals, and preventing thieves or other unauthorized persons from having access to the nest.

The invention consists of the features of construction, combination and arrangement of parts, hereinafter fully described and claimed, reference being had to the accompanying drawing, in which:—

Figure 1 is a front elevation of one form of trap nest embodying my invention.

Fig. 2 is a sectional plan view of the same on line 2—2 of Fig. 3.

Figure 3:
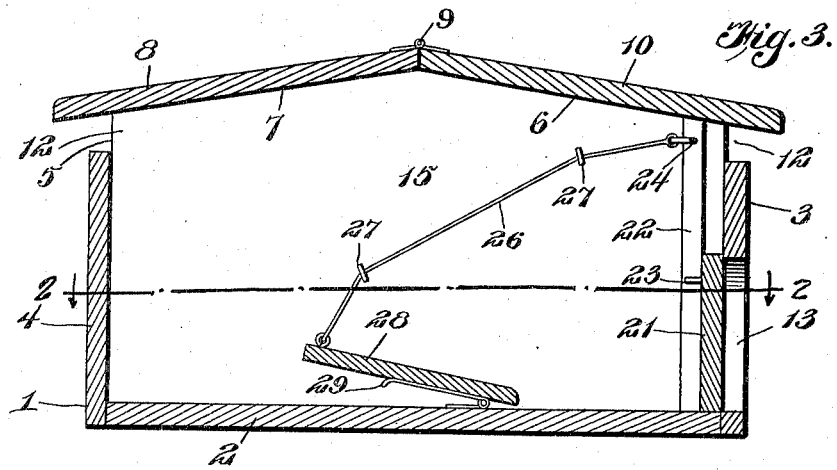
Figure 4:
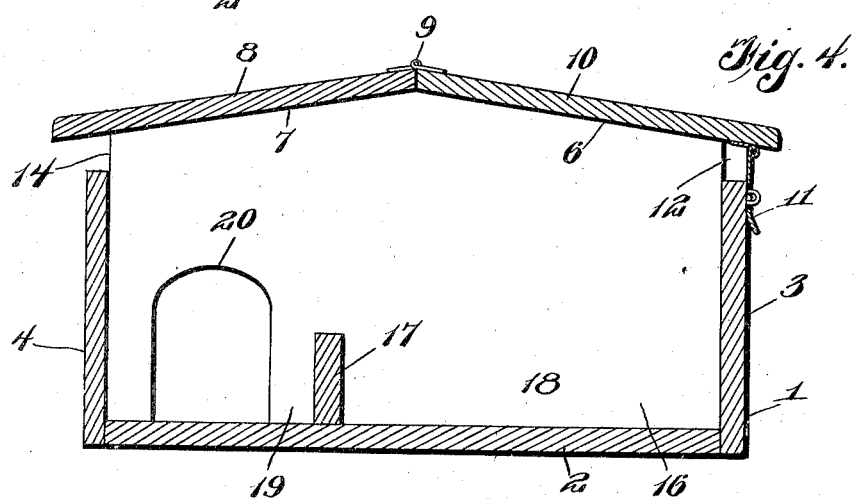

Figs. 3 and 4 are front-to-rear sections on the lines 3—3 and 4—4 of Fig. 2.

Figure 5:
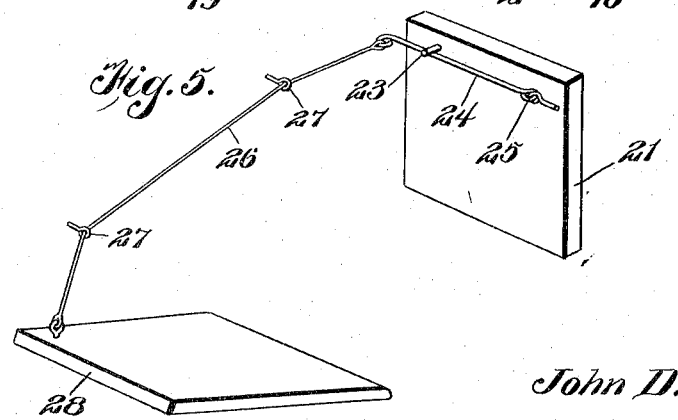

Fig. 5 is a view of the door controlling mechanism.

Referring to the drawing, 1 designates my improved hen nest, which comprises a box of rectangular or oblong rectangular form, and which may be made of wood, metal or any other suitable material or combination of materials. The box embodies in its organization a bottom wall 2, front wall 3, rear wall 4 and side walls 5 suitably connected together.

The upper edges of the side walls are arranged to slope forwardly and rearwardly, as shown at 6 and 7 respectively, and rigidly secured to the sloping rear portion 7 is a top wall 8, covering substantially the rear half of the box. To the forward edge of this top wall 8 is hinged, as at 9, a door or cover 10, adapted to rest when in closed position upon the front inclined edges 6 and to cover the forward half of the box. A lock 11 of any suitable construction is provided for securing the door in closed position. The front and rear walls terminate below the upper edge of the side walls, so as to provide openings or spaces 12 for free ventilation throughout the nest under all conditions. These openings may be covered, if desired, by screen material, but are such size as to prevent access of rodents or other animals to the nest, and too small to permit of the insertion of the human hand within the nest when the door is locked, so that access to the nest can only be obtained by a person possessed of a proper type of key. A suitable opening or door way 13 of restricted size, is however provided in the front wall 3 to permit free entrance and exit of the hen except at such times as when the trap door is closed.

The interior of the box is divided by a partition 14 into compartments 15 and 16, said partition extending the full depth of the side walls and having sloping surfaces conforming to the sloping edges thereof. The compartment 15 is arranged at one side of the center of the box and forms a passage way for the entrance and exit of the hen, which passage way communicates at its forward end with the door way or opening 13. The compartment 16 is sub-divided by a short transverse partition 17 into a forward nest chamber 18 and a rear antechamber 19, which antechamber is in communication with the rear portion of the passage way 15 through a restricted opening 20 in the partition 14, such opening 20 being of just sufficient size to permit of the passage of a hen between the passage way and antechamber. The partition 17 forms a short wall to retain and prevent the nest material from being scattered, but is sufficiently low in height to permit the hen to pass thereover. The antechamber forms a compartment in which food and drink may be placed when it is desired to confine the hen for any considerable period, such as for a setting period. The food and water may be introduced at intervals into the antechamber through the passage way 15 and opening 20 when the upper door or cover 10 is thrown open, thus avoiding the necessity of disturbing the hen or setting of eggs in the nest chamber, such as would be liable to occur in passing food and water through said chamber.

A vertical sliding trap door 21 is provided for closing the door way 13, and this trap door is mounted to slide between the front wall and guide strips 22 secured to the adjacent side wall and partition 14. Carried by the door is a pin or projection 23 which is adapted to rest upon a latch rod 24, pivoted to one of the guides 22, as shown at 25, the opposite end of said latch rod being connected with one end of a wire or like connection 26 leading through guides 27 to the rear free edge of a depressible platform 28. The platform 28 is arranged within the passage way 15 and is hinged at its forward edge to the bottom wall 2, a suitable spring or springs 29 being associated with the pivotal connection to hold the platform elevated when raised to a certain position. When the pin or projection 23 is engaged with the latch rod 24 the door 21 will be held open, allowing the hen to enter the passage way. When, however, the hen steps upon the depressible platform in passing through the passage way into the antechamber, such platform will be depressed and will draw upon the flexible connection 26 to swing the latch bar rearwardly, thus withdrawing it from engagement with the pin and allowing the door to drop by gravity to close the opening 13, whereby the hen will be confined within the nest box. In setting the trap door for operation, the door is raised until the pin 23 is sufficiently elevated to engage the latch bar, and the platform is then elevated and the latch bar moved rearwardly into engagement with the pin, thus holding the door from downward movement in an obvious manner. In practice, it will be understood that the wire or like connection 26 is sufficiently stiff to adapt the end thereof connected with the latch bar 24 to hold said bar supported under the weight of the door. This end of the connection 26 may be reinforced and made comparatively short, for the purpose described, by disposing the forward guide 27 in close proximity to the latch member. Also it will be understood that the door 21 may be fitted to slide in its guides with sufficient ease to adapt it to close easily by gravity when released, but with sufficient friction to require but a small amount of resistance on the part of the latch bar 24 to hold the door supported.

It will be observed that by the construction described direct communication between the passage way and the nest chamber is prevented, and indirect communication between the same and the nest chamber is afforded through the opening 20 between the rear end of the passage way and the antechamber. By this means, when the door or cover 10 is closed, the hen is permitted to have free entrance and exit through the opening 13, but the contents of the nest chamber are protected from theft, because of the impossibility of a would-be thief passing his hand into the nest chamber through the indirect channel afforded. Also this indirect channel deters or prevents rats or other animals from passing into the nest chamber. By using the nest as a trap nest, it is obvious that the laying capacity of a hen may be determined in the usual way, and that the trap door may be kept closed to keep a shirking hen confined throughout a full setting period, thus preventing the hen from leaving the nest and allowing the eggs to spoil. Other advantages of the construction will be obvious to those versed in the art from the foregoing description.

It will, of course, be understood that while I have shown a nest box having a single nest compartment and single passage way communicating therewith, any number of nest chambers and passage ways may be provided in a nest box by simply increasing the size thereof to the extent desired.

Having thus fully described my invention, I claim:

1. A hen's nest having an entrance and exit passage provided with a doorway, a vertically sliding door, a spring elevated depressible platform in said passage, a latch bar hinged at one end to the nest structure at one side of the passage and projecting across the doorway to the opposite side of the passage, spaced guides at the latter named side of the passage arranged at different elevations and respectively in proximity to the doorway and depressible platform, a projection upon the door adapted to rest upon the latch bar when the latter is held elevated and in horizontal position, and a wire connection extending through said guides and terminally coupled to the platform and to the free end of the latch bar said wire being sufficiently stiff to support the door.

2. A hen's nest comprising a box or casing embodying bottom, side, front and rear walls, said front wall being provided with a door way, a partition extending between the front and rear walls and separating the interior of said casing into a passage way communicating with said door way and a nest compartment communicating with said passage way, the said side walls and partition having their upper edges extended above the plane of the upper edges of the front and rear walls and sloping from a central point toward the front and rear of the casing, a short vertical transverse partition within the nest compartment separating the same into a front nest chamber and a rear antechamber, a door for closing the door way, a fixed wall covering the rear portion of the passage way and antechamber and the rear portion of the nest chamber and resting upon the rear sloping surfaces of the side walls and first named partition, and a front cover hinged to said fixed wall and adapted when in closed position to rest upon the front portion of the sloping edges of said side walls and first named partition, said fixed wall and cover being thereby supported above the upper edges of the front and rear walls to form intervening ventilation passages, and means for locking said cover in closed position.

In testimony whereof I affix my signature.

JOHN D. SHOCKLEY.